United States Patent
Amo Garrido et al.

(10) Patent No.: US 8,453,964 B2
(45) Date of Patent: Jun. 4, 2013

(54) WIND TUNNEL AIRCRAFT MODEL WITH TRUNCATED WING

(75) Inventors: Esteban Amo Garrido, Madrid (ES); Pilar Vela Orge, Aranjuez (ES); Angel Pascual Fuertes, Alcobendas (ES)

(73) Assignee: Airbus Operations S.L., Madrid (ES)

(*) Notice: Subject to any disclaimer, the term of this patent is extended or adjusted under 35 U.S.C. 154(b) by 655 days.

(21) Appl. No.: 12/689,428

(22) Filed: Jan. 19, 2010

(65) Prior Publication Data

US 2011/0106503 A1 May 5, 2011

(30) Foreign Application Priority Data

Oct. 29, 2009 (ES) .................................. 200930928

(51) Int. Cl.
*G01M 9/00* (2006.01)
*G01M 9/08* (2006.01)
*B64C 3/14* (2006.01)

(52) U.S. Cl.
USPC .................. 244/35 R; 244/123.1; 73/118.03; 73/147; 73/804

(58) Field of Classification Search
USPC ......... 244/1 R, 34 R, 35 R, 123.1; 73/118.03, 73/147, 802, 804
See application file for complete search history.

(56) References Cited

U.S. PATENT DOCUMENTS

| | | | | |
|---|---|---|---|---|
| 6,553,823 | B2* | 4/2003 | Omotani et al. ................. | 73/147 |
| 7,581,697 | B1* | 9/2009 | Hagemeister et al. ..... | 244/117 R |
| 7,987,707 | B2* | 8/2011 | Milde ............................. | 73/147 |
| 8,056,853 | B2* | 11/2011 | Eisentraut et al. .............. | 244/46 |
| 2009/0179109 | A1 | 7/2009 | Akkermann et al. | |

FOREIGN PATENT DOCUMENTS

| | | |
|---|---|---|
| DE | 36 07 600 A1 | 9/1987 |
| DE | 42 21 540 A1 | 1/1994 |
| EP | 0 299 436 A2 | 1/1989 |
| GB | 837553 | 6/1960 |
| GB | 2 217 011 A | 10/1989 |
| JP | 4-70534 | 3/1992 |
| JP | 4-70535 | 3/1992 |

* cited by examiner

*Primary Examiner* — Rob Swiatek
(74) *Attorney, Agent, or Firm* — Oblon, Spivak, McClelland, Maier & Neustadt, L.L.P.

(57) ABSTRACT

An aircraft model for testing in a wind tunnel of width W including a fuselage, a truncated wing whose length L1 is less than the length L of a full scaled wing and additional components in the rear of the aircraft as, in particular, a horizontal tail plane, that produces the same downwash that arrives to the additional components as in a full scaled model. The shape of the truncated wing may be designed for having a similar lift distribution to the lift distribution of a full scaled wing along at least the maximum length L2 in the Y-axis of any component in the rear of the aircraft. The invention also relates to a method for designing the truncated wing.

3 Claims, 3 Drawing Sheets

Background Art

WIND TUNNEL AIRCRAFT MODEL WITH TRUNCATED WING

FIELD OF THE INVENTION

The present invention refers to aircraft scaled models used in wind tunnels for analysing its aerodynamic properties and more particularly to aircraft scaled models for analysing the aerodynamic properties of the aircraft tails and rear fuselage.

BACKGROUND OF THE INVENTION

The performance of aircraft mobile surfaces such as vertical tails, horizontal tail planes, elevators or rudders placed in the rear part of the aircraft is one of the more important issues in global aircraft design. Said surfaces are used as control surfaces, for example a horizontal tail plane is used to control pitch and a rudder is used to control yaw. Therefore its behavior defines aircraft control laws and design constrains.

When designing the elements composing an aircraft, such as the fuselage, wings, stabilizers, etc. it is necessary to know the aerodynamic properties of such components. In view of the large size of aircrafts, aerodynamic tests are made with scaled models that reproduce the whole or at least a part of the aircraft, the scaled models being subjected to tests in a wind tunnel.

Those tests are particularly important for the rear part of the aircraft because it is difficult to obtain comprehensive analytical models of its aerodynamic behaviour since the rear part of the aircraft is affected by other parts of an aircraft and particularly by the aircraft wing. For example they can suffer a loss of upstream dynamic pressure due to effects caused by the wing which is difficult to take into account using classical analytical schemes.

Even though the results currently obtained in wind tunnel tests allow a good understanding of the aerodynamical behaviour of tails and other components of the rear part of the aircraft, they are usually produced at a Reynolds number very much lower than the real aircraft flight Reynolds number and therefore the scaling of the results is sometimes difficult.

The present invention is intended to improve this drawback.

SUMMARY OF THE INVENTION

It is an object of the present invention to provide a wing design methodology that, starting from one available reference wing in an aircraft model develops a different twisted and truncated wing with smaller span, that allows to increase the maximum scale of the aircraft model producing a higher Reynolds number during wind tunnel tests as, in this way, the size of the aircraft model wing will not be the part which limits the scale of the model.

It is another object of the present invention to provide an aircraft model for wind tunnel testing that allows improving the results obtained in flow investigations around tails and rear fuselage.

It is another object of the present invention to provide an aircraft model for wind tunnel testing that allows optimizing the costs of flow investigations around tails and rear fuselage.

It is another object of the present invention to provide an aircraft model having a truncated wing that allows reproducing in the aircraft model rear part the flow conditions produced by the reference wing.

It is another object of the present invention to provide an aircraft model which allows to test the rear part of the aircraft at the maximum Reynolds number allowed, limited only by the size of the aircraft tails and rear parts.

In one aspect these and other objects are met by providing a method for designing a truncated wing with respect to a full scaled reference wing in an aircraft model whose configuration also comprises a fuselage and additional components in the rear of the aircraft for performing flow investigations around said additional components in a wind tunnel of width W, comprising the following steps:

Obtaining the initial lift distribution $I_n$ and the additional lift distribution $a_n$ in the reference wing.

Defining the length L1 of the truncated wing in the Y-axis.

Obtaining the truncated wing chord distribution reconstructing the additional lift distribution $a_n$ in the reference wing along the truncated wing.

Obtaining the truncated wing twist distribution reconstructing the initial lift distribution $I_n$ in the reference wing along the truncated wing.

Keeping the profiles, the leading edge geometry and the relative thickness distribution of the reference wing in the truncated wing.

In another aspect the above-mentioned objects are met by providing an aircraft model whose configuration comprises a fuselage, the wing and additional components in the rear of the aircraft, which is a model built with the maximum scale allowed by the wind tunnel test section dimensions with the exception that it has a truncated wing having a length L1 less than the length L of a full scaled wing but producing the same downwash in the rear of the aircraft.

In a preferred embodiment, said truncated wing geometry produces a similar lift distribution than the one produced by the full span model wing along at least the maximum length L2 in the Y-axis of any component in the rear of the aircraft. Hereby, it is achieved an aircraft model as large as possible in the rear of the aircraft for improving the results of wind tunnel data.

Other characteristics and advantages of the present invention will be clear from the following detailed description of embodiments illustrative of its object in relation to the attached figures.

DETAILED DESCRIPTION OF THE INVENTION

Figure 1:
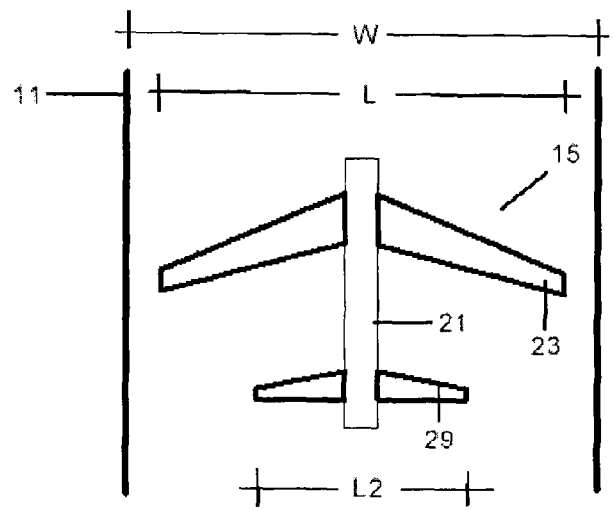
FIG. 1 shows a schematic plan view of a full scaled aircraft model.

Nowadays the design of aircrafts is done using Computational Fluid Dynamics (CFD) and Wind Tunnel Testing (WTT).

Wind tunnels are installations in which the aerodynamic behaviour of a scaled model of a proposed aircraft can be analysed. They are structures in which wind is produced, usually by a large fan, where the flow passes through one scaled model which is connected to instruments that measure and record the airflow around it and the aerodynamic forces that act upon it. The information obtained in wind tunnels is used for characterising the behaviour of the aircraft model under different flow conditions and therefore allows improving its design.

The aircraft model is placed in the wind tunnel with a suitable instrumentation to provide the required data. To obtain meaningful data, the flow parameters of Mach number and Reynolds number in the wind tunnel shall match the real aircraft flight conditions.

The Reynolds number expresses the ratio of inertial (resistant to change or motion) forces to viscous (heavy and gluey) forces. From a detailed analysis of the momentum conservation equation, the inertial forces are characterized by the product of the density r times the velocity V times the gradient of the velocity dV/dx. The viscous forces are characterized by the viscosity coefficient mu times the second gradient of the velocity d^2V/dx^2. The Reynolds number Re then becomes:

$$Re=(r*V*dV/dx)/(mu*d^2V/dx^2)$$

$$Re=(r*V*L)/mu$$

where L is some characteristic length of the problem. If the Reynolds numbers in the wind tunnel and in the field are close, then we properly model the effects of the viscous forces relative to the inertial forces. In the wind tunnels since the size of the test section and the power of the fan limit the size of the model and the maximum speed of the flow, limiting the maximum Reynolds in this way.

Another relevant parameter is the Mach number M, the ratio of the velocity of the object to the speed of sound a.

$$M=V/a$$

The Mach number appears as a scaling parameter in many of the equations for compressible flows, shock waves, and expansions. In wind tunnel testing, the experiment Mach number shall match the real flight conditions Mach number.

From those theoretical considerations it is clear that for improving the results of the wind tunnel data, the models should be manufactured as large as possible. If the main subject of the wind tunnel testing is a flow investigation around tails and rear fuselage taking into account the influence of the wing, the length of the wing limits the possibilities of expanding its size within the existing wind tunnel test section. If the wind tunnel model rear aircraft scale is chosen in order to maximise the Reynolds number, the corresponding wing length would not fit inside current wind tunnels test section.

The basic idea of this invention for increasing the size of the aircraft model components placed in the rear part of the aircraft for improving the results of the wind tunnel data using current facilities is truncating the wing since the subject of these kind of tests is the tails and the other components in the rear aircraft, not the wing. The geometry of the reference full span wing is studied and used to build the corresponding truncated wing.

The new truncated wing is designed in such a way that the downwash in the rear end of the wind tunnel model is the same (very similar) as the downwash generated by the real wing, so that the tails and rear fuselage "do not see" that a new and shortened wing is installed in the model.

Figure 2:
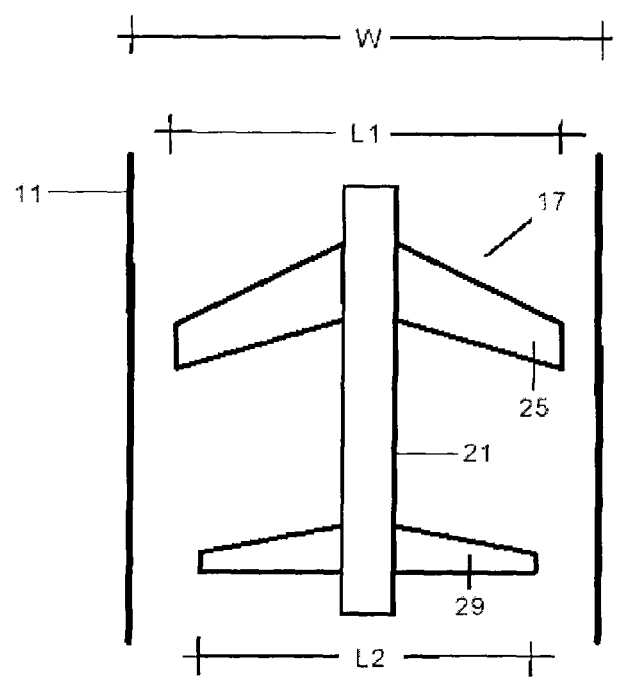
FIG. 2 shows a schematic plan view of an aircraft model according to the present invention.
Figure 3:
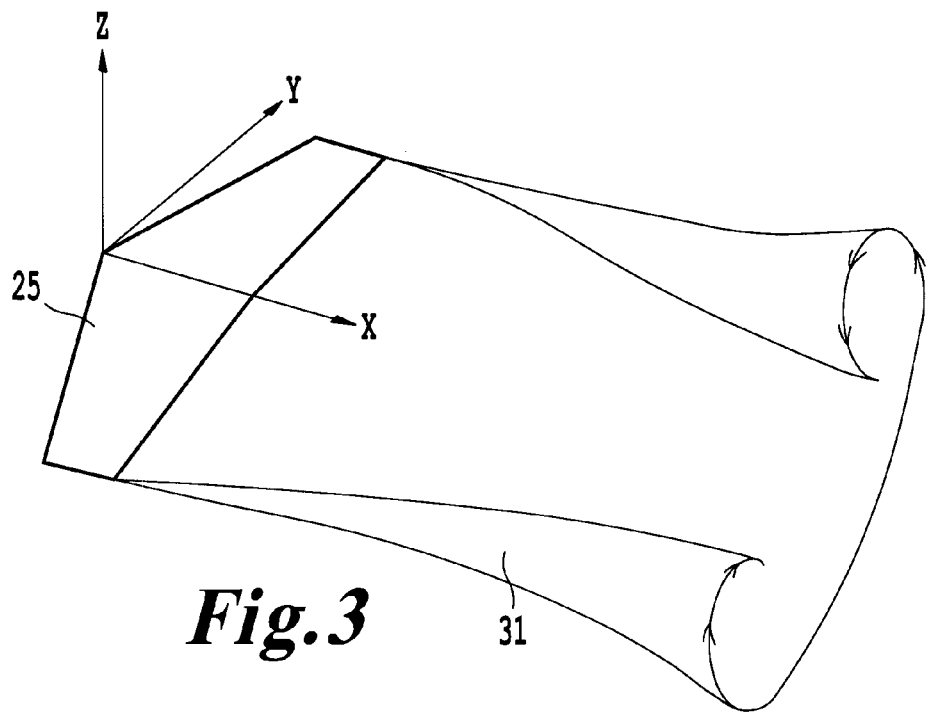
FIG. 3 shows a schematic view of the downwash produced by the aircraft wing.

The main difference between the prior art and this invention is illustrated in FIGS. 1 and 2. The maximum size of a prior art full scaled aircraft model 15 whose configuration includes a fuselage 21, a wing 23 and a horizontal tail plane 29 in the rear part of the aircraft is determined by the wind tunnel 11 width W. The rear end of the aircraft model 17 according to this invention has a bigger size compatible with wind tunnel 11 dimensions because its wing 25 is not a full span wing but a truncated wing so that the downwash generated by the wing at the rear end location is the same as the downwash that would be produced by full span wing 23 at the rear end location. In FIG. 3 the downwash produced by wing 25 is illustrated.

Figure 4A:
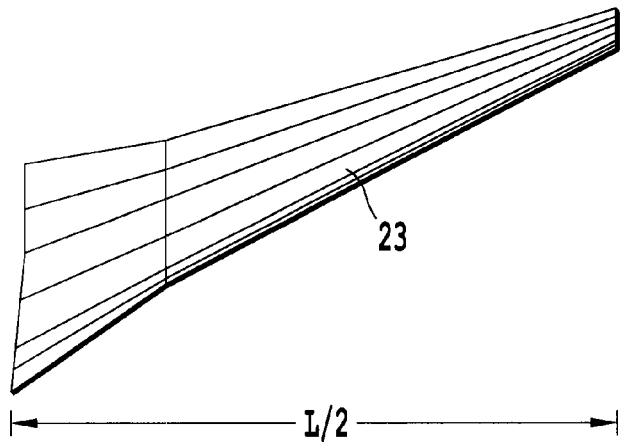
FIG. 4a shows a schematic plan view of a full scaled wing and FIG. 4b shows a schematic plan view of a truncated wing according to the present invention.
Figure 4B:
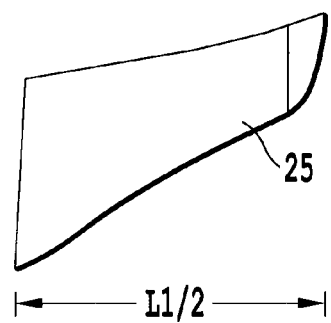

The conditions to be met by said truncated wing 25 having a length L1 in the Y-axis to produce the same downwash as the full span wing 23 having a length L in the Y-axis (using in both cases the same scaling factor for all aircraft model components with the only exception of the wing) are that (see FIGS. 4a, 4b and 5) the shape of the truncated wing 25 has a similar lift span-wise distribution profile 35 to the lift profile 37 of a full length model wing 23 along at least the length L2 of the horizontal tail plane 29.

An analytical explanation follows.

Reducing the wing circulation by:

$$\frac{\Gamma(y)}{bU_\infty} = \sum_{n=1}^{\infty} A_n \sin n\theta$$

$$\Gamma(y) = \frac{1}{2} U_x c(y) Cl(y) \Rightarrow \sum_{n=1}^{\infty} A_n \sin n\theta$$

$$= \frac{1}{2} k(\theta) \frac{dCl}{d\alpha} \left[ \alpha(\theta) - \frac{1}{2\sin\theta} \sum_{n=1}^{\infty} n A_n \sin n\theta \right] \Rightarrow A_n$$

If the truncated wing has the same $A_n$, it has the same lift distribution.

But, $A_n$ coefficients for the full wing can be separated into $I_n$ and $a_n$ coefficients according to:

$$A_n = I_n + \alpha\left(\frac{\pi}{2}\right) a_n$$

where $I_n$ and $a_n$ follow the following relations:

$$\sum_{n=1}^{\infty} I_n \sin n\theta = \frac{1}{2} k(\theta) \frac{dCl}{d\alpha} \left[ \varepsilon(\theta) - \frac{1}{2\sin\theta} \sum_{n=1}^{\infty} n I_n \sin n\theta \right]$$

$$\sum_{n=1}^{\infty} a_n \sin n\theta = \frac{1}{2} k(\theta) \frac{dCl}{d\alpha} \left[ 1 - \frac{1}{2\sin\theta} \sum_{n=1}^{\infty} n a_n \sin n\theta \right]$$

As it can be seen, $I_n$ depends on the dimensionless chord distribution $k(\theta)$ and on the twist distribution $\varepsilon(\theta)$ but $a_n$ depends only on the dimensionless chord distribution $k(\theta)$. So, if the chord distribution of the truncated wing is modified to produce the same $a_n$ coefficients as the full length wing, we can use this chord distribution in $I_n$.

With the previously obtained wing chord distribution in $I_n$, we modify the twist distribution $\varepsilon(\theta)$ of the truncated wing to have the same $I_n$ coefficients as the full span wing.

Doing so we have a truncated wing 25 with the same $I_n$ and $a_n$ coefficients as the full span wing 23 and therefore the same $A_n$ coefficients which means the same lift distribution and therefore the same downwash distribution.

Figure 5:
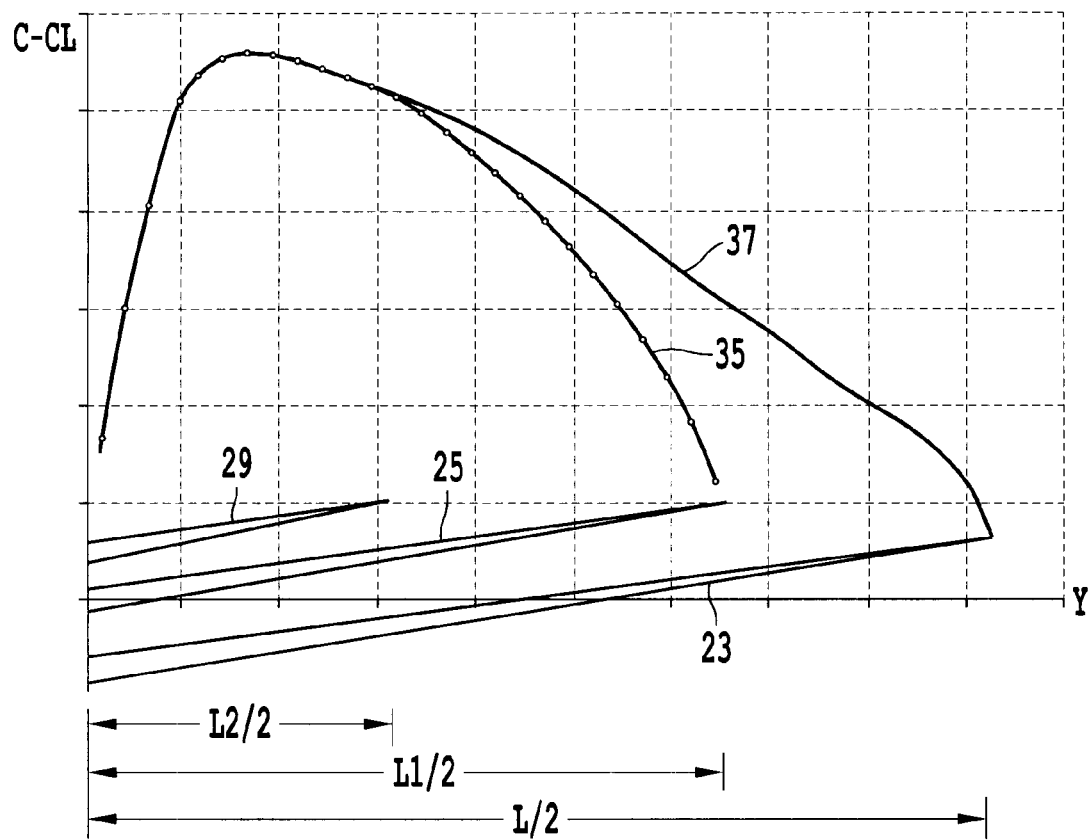
FIG. 5 show the lift profiles of a full scaled wing and a truncated wing.

FIG. 5 shows said lift profiles 35, 37 for an embodiment of this invention, as C-CL vs. Y curves, where C-CL stands for Chord in each wing section—Lift in said chord, and Y stands for the lateral distance measured from the aircraft symmetry plane for an angle of attack of 2°. The lower part of FIG. 5 shows schematically the lateral span of the horizontal tail plane 29, the truncated wing 25 and the full scaled wing 23.

As it can be easily appreciated the lift profiles 35, 37 of the truncated wing 25 and the wing 23 along the span L2/2 of the horizontal tail plane 29 are almost identical.

Said embodiment was carried out in a wind tunnel of W=2.78 m. The reference length L/2 of the full scaled wing 23 was 1.38 m and the length L2/2 of the horizontal tail plane 29 was 0.48 m. The length L1/2 of the resulting truncated wing 25 according to the invention was 1 m. Therefore it was achieved a significant size increase of the model rear end part. The span of the aircraft model 17 in the Y-axis shall be less than 75% of the wind tunnel width W so that there is enough distance to the wind tunnel walls to avoid disturbances.

One of the advantages of this invention is that it achieves an improvement of the quality of the wind tunnel test results without any cost increment because the truncated wing replaces the full span wing. So only one wing would be required to be manufactured for the model, as usual.

Modifications may be introduced into the preferred embodiment just set forth, which are comprised within the scope defined by the following claims.

The invention claimed is:

1. A method for designing a truncated wing with respect to a full scaled reference wing for an aircraft model whose configuration also comprises a fuselage and additional components in the rear of the aircraft for performing flow investigations around said additional components in a wind tunnel of width W, the method comprising:
    obtaining the initial lift distribution $I_n$ and the additional lift distribution $a_n$ in the reference wing;
    defining the length L1 of the truncated wing in the Y-axis;
    obtaining the truncated wing chord distribution and reconstructing the additional lift distribution $a_n$ in the reference wing along the truncated wing;
    obtaining the truncated wing twist distribution and reconstructing the initial lift distribution $I_n$ in the reference wing along the truncated wing; and
    keeping profiles, the leading edge geometry and the relative thickness distribution of the reference wing in the truncated wing.

2. The method for designing a truncated wing according to claim 1, wherein the length L1 is less than 75% of the wind tunnel width W.

3. The method for designing a truncated wing according to claim 1, wherein said components in the rear of the aircraft include a horizontal tail plane.

* * * * *